March 14, 1933. LE ROY O. BROWN 1,900,906
PORTABLE ELECTRIC ILLUMINATING APPARATUS
Filed May 18, 1931   5 Sheets-Sheet 1
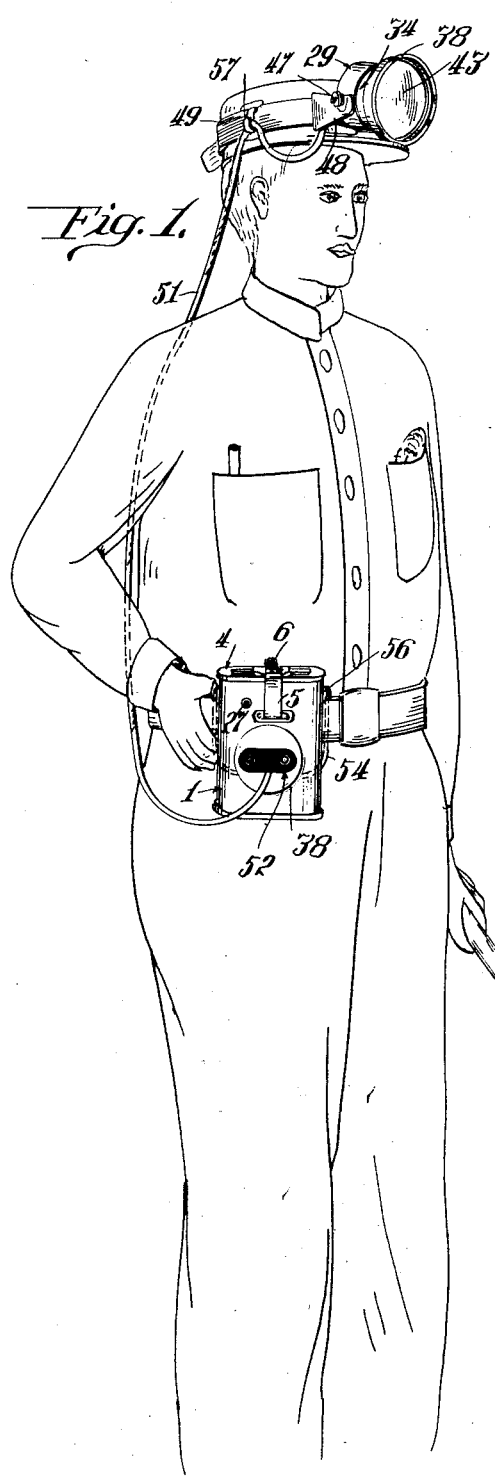
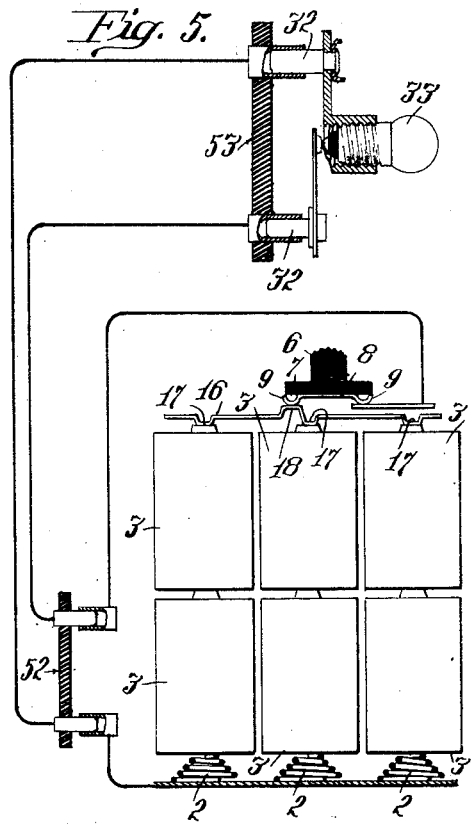
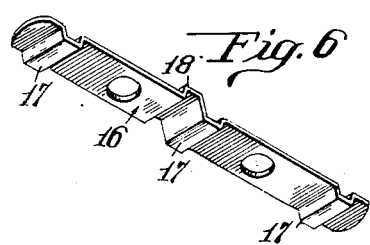
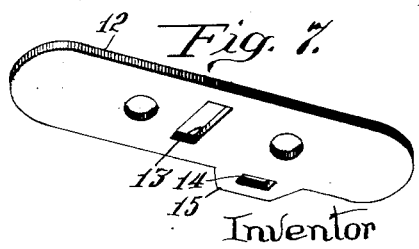
Inventor
Leroy O. Brown
Attorney.

March 14, 1933.   LE ROY O. BROWN   1,900,906
PORTABLE ELECTRIC ILLUMINATING APPARATUS
Filed May 18, 1931   5 Sheets-Sheet 2
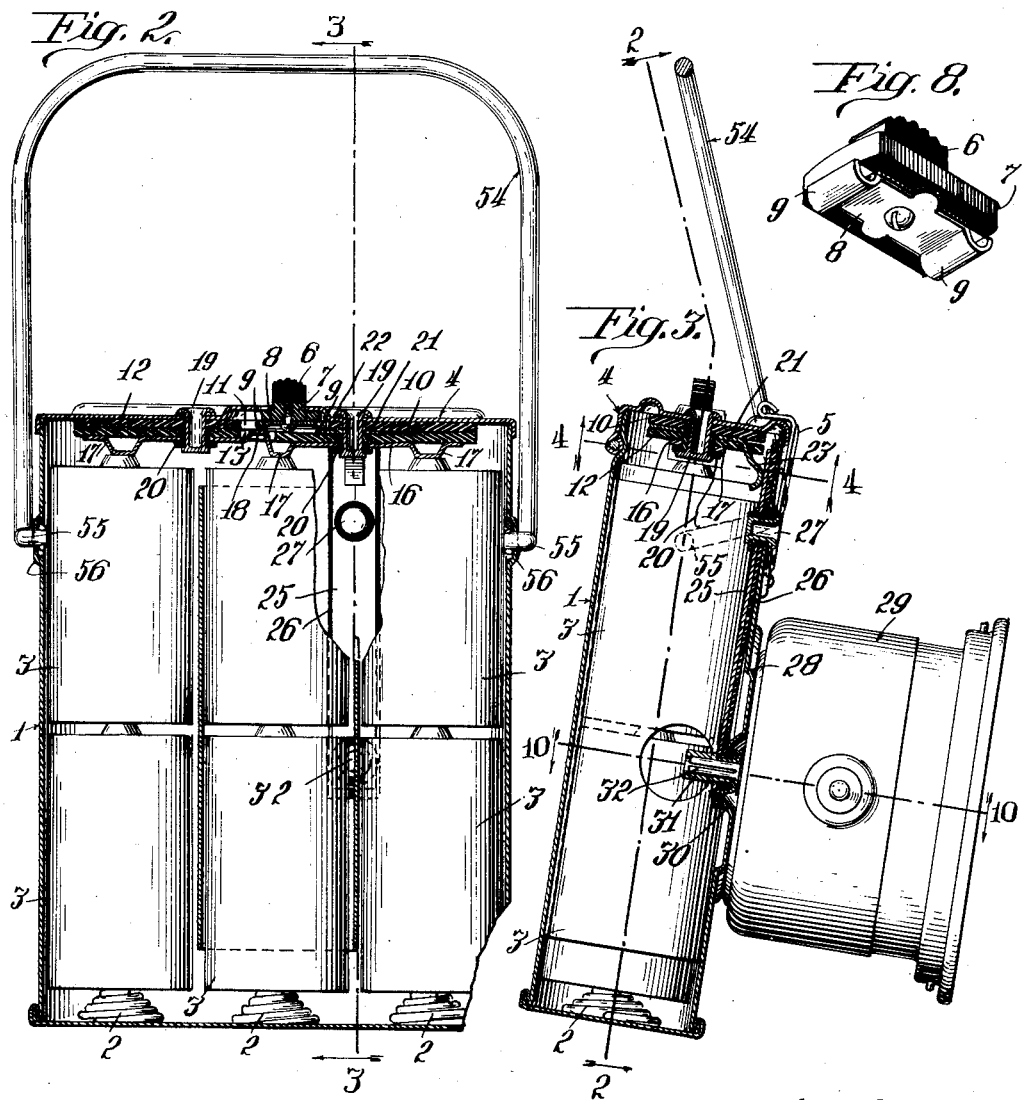
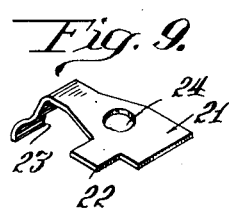
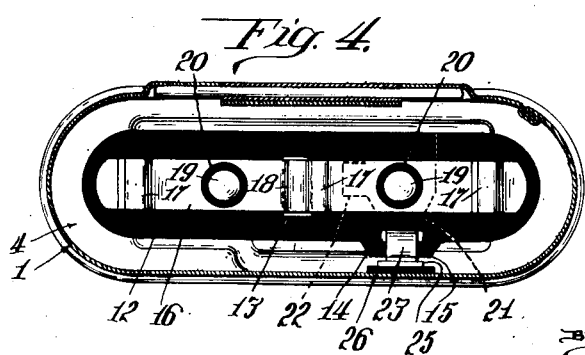
Inventor
Leroy O. Brown
By Rudolph
Attorney.

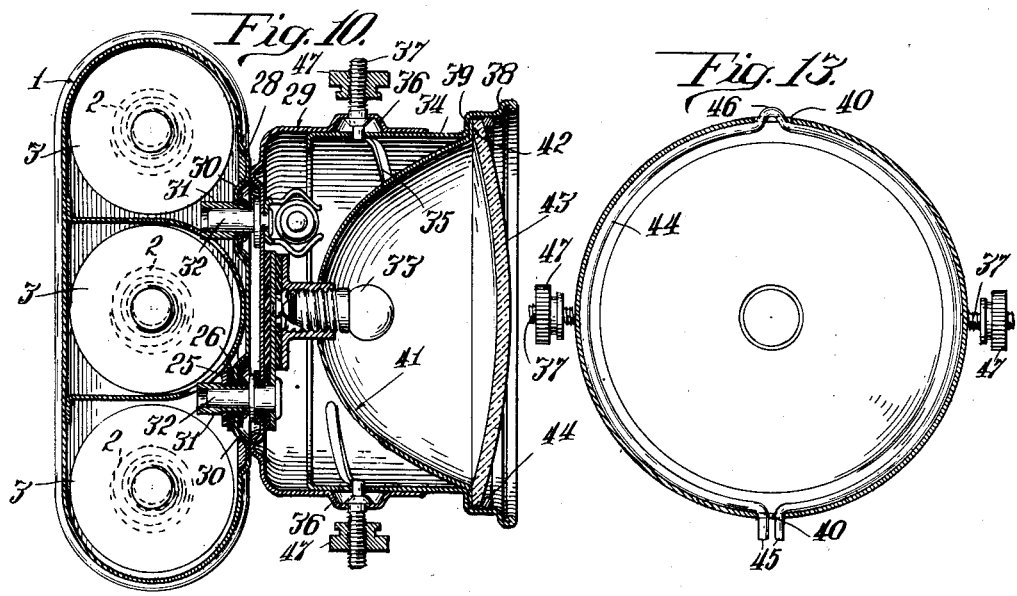

March 14, 1933.  LE ROY O. BROWN  1,900,906
PORTABLE ELECTRIC ILLUMINATING APPARATUS
Filed May 18, 1931  5 Sheets-Sheet 4
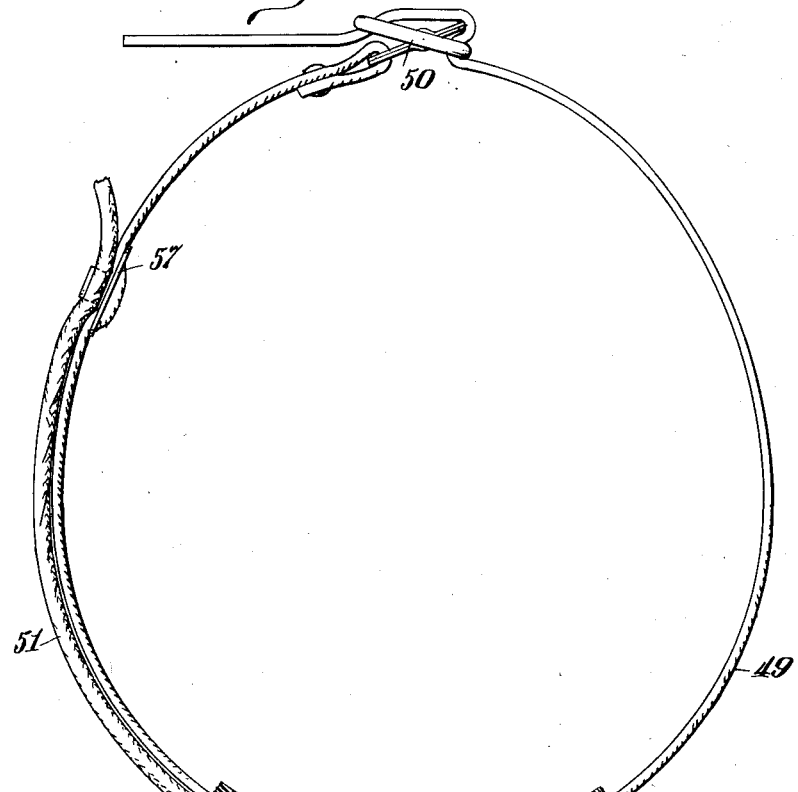
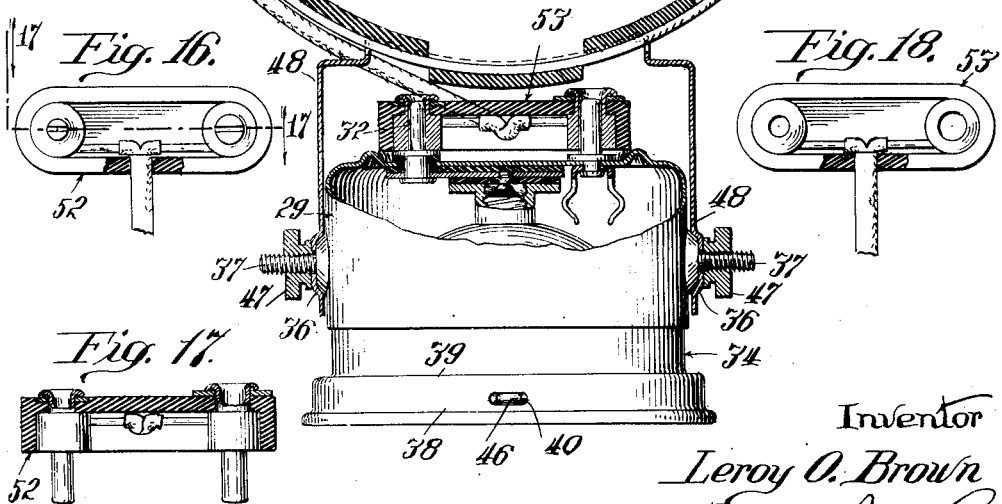

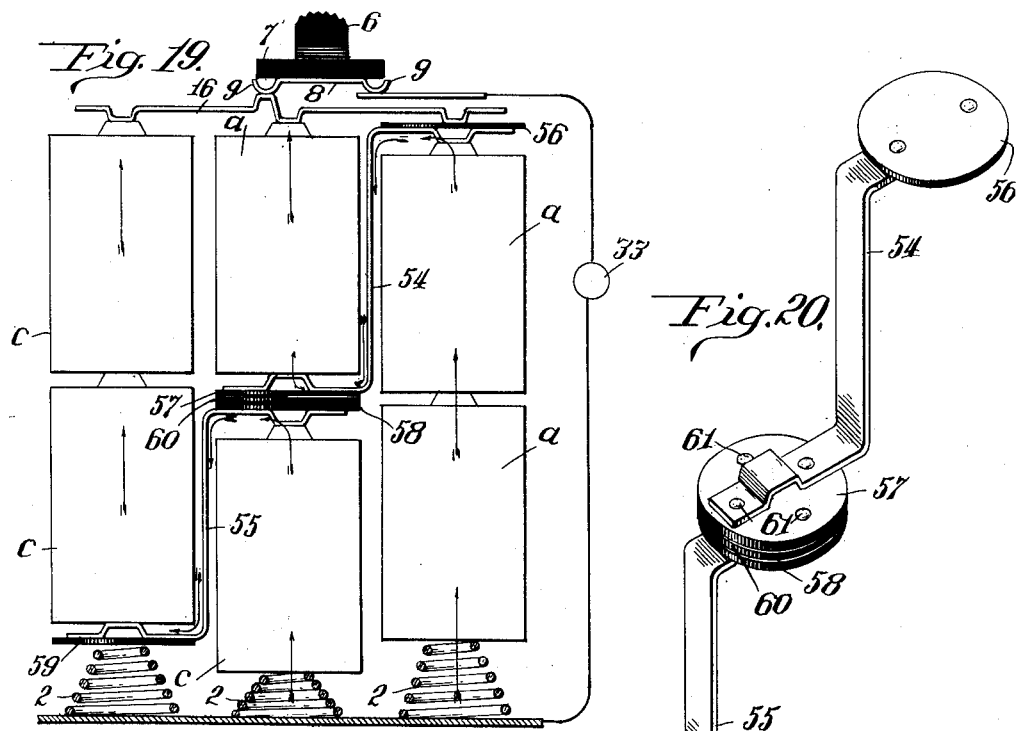

Patented Mar. 14, 1933

1,900,906

UNITED STATES PATENT OFFICE

LE ROY O. BROWN, OF CHICAGO, ILLINOIS, ASSIGNOR TO JUSTRITE MANUFACTURING COMPANY, OF CHICAGO, ILLINOIS, A CORPORATION OF ILLINOIS

PORTABLE ELECTRIC ILLUMINATING APPARATUS

Application filed May 18, 1931. Serial No. 538,027.

This invention has for its general object to provide a portable electric illumination outfit adapted for use by miners, hunters, and otherwise for temporary illuminating purposes.

A more specific object of the invention is to provide a battery casing and a lamp casing which are equipped with interengaging means for detachably securing the lamp casing to the battery casing and to provide an electric cord equipped with means for detachably connecting the same with the battery casing and the lamp casing, when the latter is detached from the battery casing, thereby to connect electrically the batteries of the casing with the lamp of the casing to enable the lamp casing to be manipulated independently of the battery casing.

A further object of the invention is to provide a battery casing and batteries therefor, together with a manually operable switch for said casing so relatively arranged that the casing may be easily emptied of and refilled with batteries, and wherein the mere insertion of the batteries and closing of the casing effects a series parallel connection of the batteries with the electric switch of the casing.

A further object of the invention is to provide a battery casing of the type aforesaid, which is flat and compact and is equipped with a bail so formed and arranged relatively to said casing as to permit the latter to be attached easily to a belt or waist-band of clothing worn by the carrier of the outfit and which, when used to suspend the lamp from a hand, will incline the battery casing out of vertical position, thus projecting the light from the lamp casing attached to the battery casing, at a downward angle to illuminate the ground in advance of the carrier of the outfit for pathfinding purposes.

Another object of the invention is to provide a battery casing equipped with a hinged cover containing a very compact electric switch which includes means whereby the movable member of the switch is snapped into and out of circuit closing position thereby to prevent accidental closure of the switch in handling the device.
A suitable embodiment of the invention is illustrated in the accompanying drawings, wherein:

Fig. 1 shows a person equipped with an illuminating outfit constructed in accordance with the invention, the battery casing being attached to the belt and the lamp casing being attached to a head-strap as for use in mining or hunting.

Fig. 2 is a vertical sectional view of the battery casing on the line 2—2 of Fig. 3, the bail of the casing being in position for suspending the same from a hand.

Fig. 3 is a vertical sectional view of the battery casing taken on the line 3—3 of Fig. 2, the lamp casing being shown attached to the battery casing, and the latter as disposed in hand-suspended position.

Fig. 4 is a plan section of the battery casing on the line 4—4 of Fig. 3.

Fig. 5 is a diagrammatic view showing the battery arrangement, the electric circuit through the lamp, and the controlling switch.

Figs. 6, 7, 8, and 9 are detail perspective views of component parts of the electric switch of the apparatus.

Fig. 10 is a plan section on the line 10—10 of Fig. 3.

Fig. 11 is a diametric vertical section of the lamp casing.

Figs. 12 and 13 are transverse sections on the lines 12—12 and 13—13, respectively, of Fig. 11.

Fig. 14 is a perspective view of a member of the lamp casing.

Fig. 15 is a plan view, partly in section, of a head strap with the lamp casing attached thereto.

Fig. 16 is an end elevation, partly in section, of one of the cord attaching members.

Fig. 17 is a sectional view of the same on the line 17—17 of Fig. 16.

Fig. 18 is a view similar to Fig. 16 showing the other cord attaching member.

Fig. 19 is a diagrammatic view similar to Fig. 5, showing the batteries disposed in two sets of three each in parallel by means of an insert in the casing.

Fig. 20 is a perspective of the insert used to change the relative association of the batteries.

Fig. 21 is a plan section showing a modification in the construction of the casing to accommodate the insert shown in Fig. 20.

The battery casing of the present invention comprises a comparative flat elongated sheet metal receptacle 1 having substantially semi-cylindrical side walls, flat parallel front and rear walls, and a flat bottom wall to which springs 2 for yieldingly supporting battery cells 3 are secured. The battery cells 3 are of the conventional cylindrical dry type commonly used in electric flash-lights or lamps, the casing 1 being, in the instance illustrated, of depth sufficient to receive two sets of said batteries 3 disposed in superposed relation and is, in this instance, of width sufficient to receive three of said cells, thus providing a group of six of the latter. The centrally disposed terminals at the lower ends of the upper tier of cells 3 bear upon the upper terminals of the lower tier. The springs 2 are of the inverted cone type and contact at their apexes with the lower terminals of the lower tier of cells and thus also electrically connect the latter with the casing 1 which thus constitutes one of the terminals of the electric circuit.

The casing 1 is equipped with a hinged cover 4 and a latch member 5 for retaining the same in closed position against the action of the springs 2.

The cover 4 is provided with an elongated outwardly dished portion which is provided with a longitudinal slot through which the stem 6 of a sliding member projects. The switch member comprises a block 7 of an insulating material and a metal plate 8 having arcuate end portions 9, as shown in Fig. 8, the block 7 fitting the said dished portion of the cover and being slidab'e therein.

Secured to the inner face of the cover 4 is a plate 10 of insulating material having a slot 11 aligned with the dished portion of said cover and in which the plate 8 is slidable.

Secured to the plate 10 is the plate 12 of insulating material shown in Fig. 7, which is provided with a transverse slot 13 and a smaller longitudinal slot 14 disposed in a side projection 15 of said p!ate.

Secured to the inner face of the plate 12 is a sheet metal bar 16 provided with three downwardly projecting offsets 17 which rest upon the upper terminals of the upper tier of batteries when said cover is closed, and which is provided with an upwardly projecting offset 18 which substantially fills the slot 13 of the plate 12.

The cover 4, plates 10 and 12, and the bar 16 are provided with axially aligned perforations to receive the eyelets or grommets 19 which join all of said last-named members, there being insulating washers 20 interposed between the inner ends of the grommets 19 and the bar 16. The offset 18 is of less height than the thickness of the plate 12, The metal plate 21 having a side projection 22 and a flexible tongue 23 at one end, is interposed between the plates 10 and 12, one of the grommets 19 and a fibre washer 20 passing through a perforation 24 in said plate 21. The flexible tongue 23 projects through the slot 14 and engages a metal plate 25 secured to but insulated from the front wall of the casing 1 by means of suitable insulation 26 and the grommet 27. The front wall of the casing has a substantially centrally disposed outwardly dished portion 28 against which the rear wall of the cylindrical lamp casing 29 is adapted to bear.

In said dished portion 28 are two inwardly extending offsets 30 provided with perforations through which metal grommets 31 project, one of the latter being in contact with the casing wall and the other thereof being insulated from the casing wall and in direct contact with the plate 25.

The rounded portions 9 of the switch plate 8 normally ride upon the plate 12 of insulating material to the left of the position shown in Fig. 5. As said plate is moved to the right from this normal position, to close the electric circuit, the portion 9 at the right hand end of said plate 8 is brought to abut against the opposed side edge of the projection 22 of the plate 21 and is forced over said edge to ride upon said projection 22. At substantially the same instant that this occurs the other portion 9 of said plate passes over the left hand edge of the slot 13 into contact with the offset 18 of the bar 16 to close the circuit.

The lamp casing 29 is equipped with a pair of bifurcated terminal posts 32 which engage in the openings of the grommets 31 to effect attachment of said lamp casing 29 to the battery casing 1 and to connect electrica'ly the lamp 33 with the batteries 3 under control of the above-described switch.

From the foregoing it will be obvious that each of the three pairs of batteries are series connected with each other and all three pairs thereof are in parallel connection with the casing 1 and the bar 16, respectively. It is also obvious that by lengthening the casing 1, each set of series connected batteries may be increased to more than two and that by widening the casing 1, the number of sets of series connected batteries may be increased. It is also obvious that one or two pairs of the batteries shown may be omitted, if desired, with the result that the duration of illumination will be corresponding'v decreased.

The lamp casing 29 comprises the cylindrical cup, the bottom of which is equipped with the terminal posts 32, suitably electrically associated with the lamp 33, and a companion cylindrical member 34, provided with diametrically opposed, helically disposed arcuate slots 35, which telescopically fits the cup 29. The latter is equipped with a pair of diametrically opposed bosses 36 through which the inner extremities of threaded posts 37 project, the said inner extremities engaging in said arcuate slots 35. The said member 34 is equipped at its outer end with an outwardly offset annular flange 38 bordering an annular shoulder 39 and provided with diametrically opposed slots 40.

The dished reflector 41 is provided with a central opening through which the lamp 33 projects, is equipped at its larger end with an annular flange 42 which rests upon the said shoulder 39. The lens 43 rests upon said flange 42 and is held firmly in place by a split-ring 44 of wire equipped with terminal projections 45, which engage in one of the slots 40, and with a projection 46 engaging in the other of said slots 40.

A relative rotation of the cup 29 and companion member 34 obviously varies the position of the reflector relatively to the locus of light or lamp 33 for focal adjustment.

The posts 37 are equipped with nuts 47 and are adapted to be received in recesses in the arms 48 secured to the head strap 49 which is equipped with the buckle 50 for adjustment purposes, the nuts 47 serving to clamp the arms 48 against the bosses 36 for firmly securing the lamp casing in desired position, with respect to direction of projection of light therefrom, relatively to said arms 48.

In order that the lamp casing may be carried on the head while the battery casing 1 is either suspended from a hand or, for example, the belt of the user, a flexible electric cord 51 is provided which is equipped at one end with a two post terminal carrier 52, constituting a male coupling member and, at its other end, with a similar carrier 53 equipped with terminal sleeves constituting a female coupling member.

Thus the lamp casing may be detached from the battery casing and the posts of said lamp casing inserted into the terminal sleeves of the female coupling member and the posts of the male coupling member inserted into the grommets 31 of the battery casing to associate electrically the lamp 33 with the batteries. The lamp casing may be then mounted on the head strap (previously or thereafter mounted on the head of the user) and, by attaching the battery casing to the belt of the user, the outfit is adapted for mining, hunting, and other uses requiring freedom of both arms of the user.

To permit of easy attachment of the battery casing to the belt, and to provide a convenient carrying means, the said casing 1 is equipped with a U-shaped bail 54, the arms of which are parallel and are provided with parallel end portions 55 terminating in inwardly extending projections 56 which engage in perforations in the side walls of the casing 1 adjacent the upper end of the same. The said end portions 55 are of a length only slightly greater than one-half the distance between the front and rear walls of the casing 1 so that when the bail is disposed to project downwardly its middle portion will contact with the rear wall of the casing 1 or, if inserted behind the belt of the user (as shown in Fig. 1), will be only slightly spaced from the rear wall of said casing 1, the end portions 55 then constituting supports for said casing and resting upon the upper edge of said belt.

When the bail is used to suspend the battery casing from the hand and the lamp casing is attached to the battery casing, as shown in Fig. 3, the weight of the lamp casing will act to incline the battery casing slightly from vertical position and thus serve to dispose the said lamp casing to project light upon the ground in advance of the user.

The entire outfit is very compact and is very easily and quickly adaptable to the various desirable uses to which portable illuminating devices are appropriate.

When the flexible cord is not in use, the male coupling member thereof is engaged with the female coupling member and thus forms a loop which may be disposed conveniently about the neck of the user or suspended from his belt together with the head strap when the latter is not being worn.

The grommets 31 are disposed in alignment with the side portions of the middle pair of batteries to permit projection of the posts of the lamp casing, or male coupling member of the flexible cord, to project appreciably into the casing 1.

The head strap is also equipped with a suitable device 57 to engage the flexible cord to prevent the latter from dangling before the face of the wearer of said strap.

It is well-known in the art that a set of batteries parallel connected with a lamp will last far longer than the same number of cells successively individually supplying the lamp. Hence, the arrangement of batteries shown in Fig. 5 is very economical from the standpoint of light-hours per battery.

In many instances, the user of a portable lamp desires a stronger light and will sacrifice cost economy to obtain it as, for example, in using the lamp for hunting and other short interval use as opposed to longer period use as by miners.

To enable the user desiring a stronger light to obtain the same, I have provided the device shown in Figs. 19 and 20, which comprises a pair of substantially Z-shaped metal bars 54 and 55, to the arms of each of which insulating disks 56, 57, 58, and 59, respectively, are secured by means of rivets. Between the disk 57 of the bar 54 and the disk 58 of the bar 55, an insulating disk 60 is disposed, and rivets 61 are passed through said disks 57, 58, and 60 to join the same.

The device thus constructed is inserted, as shown in Fig. 19, so that the disk 59 rests upon one of the springs 2, the disk 56 bears against an offset 17 of the bar 16, and the disks 57, 58, and 60 are disposed between the opposed terminals of the middle pair of batteries 3. Thus the batteries *a* constitute one series and the batteries *c* constitute the other set, the arrows of Fig. 19 indicating the series arrangement.

The six batteries shown are thus divided into two sets of three each, series connected with each other, and both sets parallel connected with the battery casing and the bar 16, respectively, to provide a stronger electric current of shorter life to feed the lamp.

It will be obvious that the said insert may be reversed or inverted from the position shown in Fig. 19 without changing its effect.

To permit the insert to be used, the casing is provided internally with ribs 62 for spacing the pairs of superposed batteries from each other instead of providing the partition walls shown in Fig. 2, it being obvious that the latter or said ribs 62 may be omitted without detriment.

It will be obvious, of course, that the details of construction of the insert shown in Figs. 19 and 20 will be greatly varied to adapt it to a different number and arrangement of batteries than is herein illustrated, the sole limitation imposed being that the total number of batteries used must be an even number.

I claim as my invention:

1. In a portable electric illuminating apparatus, a metal battery casing adapted to receive a plurality of sets of battery cells and open at one end for direct insertion of cells to fill the same, springs on the bottom wall thereof, a plurality of series of superposed dry cells having the lower end terminals of the lower cells of each set engaged by said respective springs for electrically connecting said cells in parallel with said casing, a cover for said casing, a metal bar carried thereby engaging the upper terminals of the upper of said several series of batteries for electrically associating said batteries in parallel when said cover is closed, a pair of electrical terminal members mounted upon a wall of the casing with one thereof insulated from the same, a metal member insulated from the casing and in contact with the other of said terminals, a flexible metallic element carried by the cover and contacting with said metal member when the cover is closed, and means for electrically connecting said last-named member with said bar thereby to connect the cells with said terminals while the cover is closed.

2. An apparatus of the kind specified including a relatively flat metal battery casing open at one end, and adapted to receive a plurality of sets of relatively superposed conventional dry cells, the cells of each set being series-connected with each other and all of said sets being automatically parallel-connected with the bottom wall of the casing upon insertion into the latter, a cover for said casing, a metal bar carried by said cover and parallel-connecting said sets of batteries therewith as the cover is closed, a pair of lamp circuit terminals, one of which is permanently electrically connected with said casing and the other of which is adapted to be electrically connected with said bar, a switch on the cover controlling the last-named connection when the cover is closed, and a secondary circuit controlling member on said cover for automatically breaking the connection between the switch and said last-named terminal upon opening the cover.

3. Apparatus of the kind specified including a battery casing and a lamp housing snugly filled with a plurality of conventional dry cells, said casing being open at one end and permanently connected with one terminal of its battery content, a pair of terminal sockets on said casing projecting into the same, one thereof permanently electrically connected with said casing and the other thereof insulated from the said casing, and both said sockets projecting into free space between contained batteries, a cover for said battery, a terminal member thereon electrically connected with said batteries when the cover is closed, a switch on said cover adapted to connect the said insulated socket with said terminal member, and terminal plugs on said lamp housing for engaging in said sockets for securing the same to the said casing.

4. Apparatus of the kind specified, a metal casing having flat parallel front and rear walls and substantially semi-cylindrical end walls corresponding in diameter substantially with conventional cylindrical battery cells, the width and length of the casing being such as to receive snugly the three pairs of said cells with the cells of each pair superposed upon each other and series-connected, said several pairs of cells being automatically parallel-connected with the bottom wall of the casing by insertion into the latter, there being free spaces defined by contiguous cells and the front wall of the casing, lamp-circuit terminal sockets mounted upon the front wall of the casing and projecting into free space within the same, one thereof insulated from the casing, a cover for the casing, a metallic member carried by and insulated from said cover and automatically parallel-connected with said batteries upon closure of the said cover, a switch on said cover, a member thereon for connecting one terminal of said switch with the said insulated socket and connecting the latter with said metallic member upon closing said switch to complete the battery circuit to said sockets, and a lamp-housing equipped with lamp-circuit terminal plugs for engaging in said sockets for securing said housing to the said casing and completing the circuit through a lamp in said housing.

5. A battery casing having a cover and equipped with a pair of electric terminals, means permanently electrically connecting batteries contained in said casing with one of said terminals, a member on said cover arranged to be automatically electrically connected with the other terminal of said casing as said cover attains closed position, a switch member carried by said cover for engaging battery terminals as said cover attains closed position, a plate of insulating material interposed between said members and having a slot therein, a slidable flexible switch member normally engaged at both ends with said plate of insulating material and adapted to project at one end into said slot and at its other end into contact with said second member when moved to one limit of its movement to electrically connect said members, and a digitally engageable member mounted on said slidable switch member and projecting through a slot in said cover.

6. A battery casing having a cover, a pair of electrical terminals rigid with said casing, means permanently electrically connecting said batteries with one of said terminals, an insulating plate mounted in said cover and having a slot between its ends, a metal bar mounted on said plate and equipped with a projection engaging in said slot, said plate being of greater thickness than the height of said projection, said bar engaging battery terminals when the cover is closed, a metal plate mounted on the other face of said insulating plate in offset relation to said slot and equipped with a projection connecting the same with the other of said terminals when the cover is closed, a flexible switch member equipped at its ends with projections normally engaged with said insulating plate and slidable to cause one of said projections to spring into said slot for contact with said bar as the other projection passes over the edge of said metal plate to close the circuit, and a digitally engageable member mounted on said switch member and projecting through a slot in said cover.

7. An apparatus of the type specified including a metal casing adapted to receive three pairs of superposed series-connected conventional battery cells, said several pairs of cells being parallel-connected with said casing, a cover for said housing, a bar bridging the several pairs of said cells and parallel-connecting the same, a pair of terminals, one of which is electrically connected with the casing and the other of which is adapted to be connected with said bar, the said cells thus comprising two sets of three cells each adapted to be connected in parallel with the said terminals, and a Z-shaped member comprising a pair of Z-shaped bars, each having one terminal arm secured to a single insulating disk and its other terminal arm secured to another insulating disk, said member being adapted to be interposed between the said cells with one of the last-named insulating disks disposed between a cell and the said bar and the other of said last-named disks interposed between a cell and the casing and said first-named disk interposed between the middle pair of cells, said metal bars of said member each connecting three cells in series with each other and both said series becoming automatically connected in parallel with said terminals.

8. Apparatus of the kind specified including a metal casing adapted to receive a plurality of conventional cylindrical dry cells disposed side by side, the front and rear walls of said casing being flat and its side walls being substantially semi-cylindrical, said cells substantially completely filling said casing while providing substantially triangular free spaces within said casing which are bordered by the flat walls of the latter, a pair of lamp terminal sockets mounted in one wall of said casing and projecting into free space within the same, one of said sockets being permanently electrically connected with said casing and the latter permanently electrically connected with one side of the circuit established by the contained batteries, the other socket being insulated from said casing, a cover for said casing, a terminal member thereon automatically constituting the other battery circuit terminal upon closure of said cover, a switch on the latter for electrically connecting said member with the said insulated socket, and a lamp housing equipped with lamp-circuit terminal plugs for engagement in said sockets to detachably secure said housing to said casing.

In testimony whereof, I have hereunto set my hand this 30th day of April, 1931.

LE ROY O. BROWN.